UNITED STATES PATENT OFFICE.

OYSTEIN RAVNER, OF CHRISTIANIA, NORWAY, ASSIGNOR TO DET NORSKE AKTIESELSKAB FOR ELEKTROKEMISK INDUSTRI, OF CHRISTIANIA, NORWAY, A BUSINESS ENTITY.

PROCESS OF RECOVERING USEFUL SUBSTANCES FROM MINERALS AND ROCKS CONTAINING POTASSIUM.

1,377,601. Specification of Letters Patent. Patented May 10, 1921.

No Drawing. Application filed February 24, 1919. Serial No. 278,763.

*To all whom it may concern:*

Be it known that I, OYSTEIN RAVNER, a subject of Norway, and a resident of Christiania, Kingdom of Norway, have invented certain new and useful Improvements in the Processes of Recovering Useful Substances from Minerals and Rocks Containing Potassium, of which the following is a specification, this application being a continuation in part of my application Serial No. 133,159, filed November 24, 1916.

This invention relates to a process of treating minerals or rocks containing potassium for the purpose of recovering potassium compounds and other useful substances therefrom.

A number of methods have been proposed for the purpose of recovering potassium compounds from minerals or rocks containing combined potassium, such as feldspar, leucite, etc. Many of these methods are impractical in that no provision is made for the economical recovery of the other materials present such as alumina or silica.

I have discovered a method of treating the aforesaid rocks or minerals whereby a product may be obtained suitable for use as a fertilizer or whereby combined potassium and the other principal ingredients of the said rocks or minerals may be economically recovered. The process broadly contemplates the heating of the aforesaid rocks or minerals together with ashes. I have found it of advantage to employ the ashes of marine or beach plants, such as seaweed or sea-tang, etc. These ashes contain combined potassium and iodin and when employed the process provides both for the recovery of this combined potassium and of the iodin.

When the above-mentioned materials are heated with ashes from marine plants different reactions take place according to the temperature employed. At 600° C. about 50 per cent. of the potassium content of the mineral becomes water soluble. My experiments have shown that this is due to an interchange of the potassium content of the mineral with the sodium content of the ashes, whereby KCl and $K_2SO_4$ and a sodium feldspar are formed. If the temperature is raised to about 700° C. other reactions take place whereby substances of the zeolite or scapolite class, containing sodium, are formed. These substances are soluble in acids but not in water. I prefer to use temperatures above 700° C. and have found that good results are obtained with temperatures from 800° to 1100° C. At these temperatures practically all of the potassium present is rendered water soluble and the aluminium present is rendered soluble in dilute acid.

When the ashes contain combined iodin, and carbon dioxid and air are present in the furnace, the iodin will be liberated, volatilized, and may be condensed in a suitable container. The commercial marine plant ash usually contains sufficient carbon for this purpose. However, if necessary $CO_2$ may be supplied in any suitable manner.

The reactions taking place when commercial marine plant ash is employed may be represented as follows:

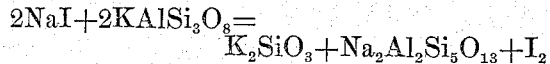

$$2NaI + 2KAlSi_3O_8 = K_2SiO_3 + Na_2Al_2Si_5O_{13} + I_2$$

In the following example the ashes from marine plants are used for the purposes of illustration but it is to be understood that the invention is not limited thereto, nor thereby.

One part by weight of a finely pulverized mineral such as feldspar, leucite, or the like, is mixed with one part by weight of ashes from marine plants. The mixture is placed in a calcining furnace where it is heated to a temperature of 800° to 1100° C. in the presence or air and carbon dioxid which pass through the furnace.

When the calcined mass is pulverized it forms a material suitable for use as a fertilizer. If it is desired to obtain the various ingredients of the mass for separate use, the combined potassium which has now been reduced to a soluble compound can be obtained by leaching with water and evaporation. The residue from the calcined product after the removal of the combined potassium, contains principally combined aluminium and silica. The combined aluminium can be obtained therefrom by treating this residue with a dilute acid which will dissolve the aluminium compounds present, and by subjecting the solution thus formed to suitable treatment such as evaporation and crystallization. The residue remaining after the combined aluminium has been removed consists of practically pure $SiO_2$.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:

1. The process of recovering useful products from rocks or minerals containing combined potassium, which comprises heating the said rocks or minerals with ashes of marine plants until a soluble compound of potassium is formed.

2. The process of recovering useful products from rocks or minerals containing combined potassium, which comprises heating the said rocks or minerals with ashes of marine plants to form a soluble compound of potassium and removing the said soluble compound.

3. The process of recovering useful products from rocks or minerals containing combined potassium, which comprises heating the said rocks or minerals with ashes of marine plants to form a soluble compound of potassium and removing the said soluble compound by leaching.

4. The process of recovering useful products from rocks or minerals containing potassium compounds, which comprises the step of reacting upon said rocks or minerals with ashes of marine plants at temperatures above 700° C.

5. The process of recovering useful products from rocks or minerals containing combined potassium, which comprises heating the said rocks or minerals with ashes of marine plants containing combined iodin until the iodin is liberated and a soluble compound of potassium formed, a current of gas which will liberate the iodin being supplied during the heating, condensing and collecting the volatilized iodin, and removing the said soluble compound of potassium.

6. The process of recovering useful products from rocks or minerals containing combined potassium, which comprises heating the said rocks or minerals with ashes of marine plants containing combined iodin until the iodin is liberated and a soluble compound of potassium formed, a current of carbon dioxid being supplied during the heating, condensing and collecting the volatilized iodin, and removing the said soluble compound of potassium by leaching.

7. The process of recovering useful products from rocks or minerals containing combined potassium and aluminium, which comprises heating the said rocks or minerals with ashes of marine plants to form a soluble compound of potassium, leaching the mass to recover the said soluble potassium compound, treating the residue with an acid to dissolve the combined aluminium, and recovering combined aluminium from the solution thus formed.

8. The process of recovering useful products from rocks or minerals containing combined potassium and aluminium, which comprises heating the said rocks or minerals with ashes of marine plants containing combined iodin until the iodin is liberated and a soluble compound of potassium formed, carbon dioxid being supplied to the charge during heating, condensing and collecting the volatilized iodin, recovering the soluble potassium compound by leaching, treating the residue with an acid to dissolve the combined aluminium and recovering combined aluminium from the solution thus treated.

9. As a new and useful article, a material suitable for use as a fertilizer, which comprises the product formed by heating rocks or minerals containing combined potassium with the ashes of marine plants until a soluble compound of potassium has been formed.

Signed at Christiania, Norway, this 6th day of January, 1919.

OYSTEIN RAVNER.